(12) United States Patent
Mulders

(10) Patent No.: US 10,609,558 B2
(45) Date of Patent: *Mar. 31, 2020

(54) METHOD AND SYSTEM FOR AUTHENTICATING A USER USING A MOBILE DEVICE HAVING PLURAL SENSORS

(71) Applicant: KONICA MINOLTA LABORATORY U.S.A., INC., San Mateo, CA (US)

(72) Inventor: Marc Mulders, San Mateo, CA (US)

(73) Assignee: Konica Minolta Laboratory U.S.A., Inc., San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/273,882

(22) Filed: Feb. 12, 2019

(65) Prior Publication Data

US 2019/0191306 A1   Jun. 20, 2019

Related U.S. Application Data

(63) Continuation of application No. 15/799,381, filed on Oct. 31, 2017, now Pat. No. 10,225,737.

(51) Int. Cl.
*H04W 12/06* (2009.01)
*H04L 29/06* (2006.01)
*H04M 1/725* (2006.01)
*H04W 12/00* (2009.01)

(52) U.S. Cl.
CPC .......... *H04W 12/06* (2013.01); *H04L 63/083* (2013.01); *H04L 63/0861* (2013.01);
(Continued)

(58) Field of Classification Search
CPC ............ H04L 9/3231; H04L 2209/805; H04L 63/083; H04L 63/10; H04L 63/107;
(Continued)

(56) References Cited

U.S. PATENT DOCUMENTS 7,813,822 B1 * 10/2010 Hoffberg ............ G06K 9/00369
381/73.1
8,302,152 B1   10/2012 Hewinson
(Continued)

*Primary Examiner* — Nathan S Taylor
(74) *Attorney, Agent, or Firm* — Buchanan Ingersoll & Rooney PC

(57) ABSTRACT

A method, system, and computer readable program code are disclosed for authenticating a user having a mobile device with plural sensors. The method includes recognizing a situation of the mobile device or the user; determining if the situation of the mobile device or the user is a predetermined situation; when the situation is the predetermined situation: determining a first action as an authentication action; determining a single sensor or a first combination of sensors among the plural sensors; and executing a first authentication for the user by using the single sensor or the first combination of sensors; and when the situation is not the predetermined situation: determining a second action as the authentication action; determining a second combination of sensors among the plural sensors; and executing a second authentication for the user by using the second combination of sensors.

20 Claims, 16 Drawing Sheets

(52) U.S. Cl.
CPC ... *H04M 1/72569* (2013.01); *H04M 1/72577* (2013.01); *H04W 12/00503* (2019.01); *H04W 12/00506* (2019.01); *H04W 12/00508* (2019.01); *H04L 2463/082* (2013.01); *H04M 2250/12* (2013.01); *H04M 2250/22* (2013.01)

(58) Field of Classification Search
CPC ....... H04L 67/18; H04L 9/321; H04L 9/3226; H04W 12/06; H04W 12/08; H04W 4/02; G06F 2221/2111; G06F 17/30241; G06F 21/31; G06F 21/32; G06F 21/40; G06F 21/44; G06F 21/45; G06F 21/6272; G06F 2221/032; G06F 2221/2117; G06F 2221/2129; G06F 2221/2135; G06F 2221/2137; G06F 2221/2149
USPC .................................................. 455/410, 411
See application file for complete search history.

(56) References Cited

U.S. PATENT DOCUMENTS

| | | |
|---|---|---|
| 9,355,236 B1 | 5/2016 | Kratz et al. |
| 9,477,825 B1 | 10/2016 | Sinchak et al. |
| 9,659,158 B2* | 5/2017 | Sheller ............... G06F 21/31 |
| 9,697,348 B1 | 7/2017 | Maresh et al. |
| 2010/0024017 A1 | 1/2010 | Ashfield et al. |
| 2011/0283338 A1 | 11/2011 | Yang et al. |
| 2012/0164978 A1 | 6/2012 | Conti et al. |
| 2013/0219454 A1 | 8/2013 | Hewinson |
| 2014/0007205 A1 | 1/2014 | Oikonomou |
| 2014/0031011 A1 | 1/2014 | West |
| 2014/0157381 A1 | 6/2014 | Disraeli |
| 2014/0270414 A1 | 9/2014 | Slaby et al. |
| 2014/0282868 A1* | 9/2014 | Sheller ............... G06F 21/31 726/3 |
| 2015/0242605 A1* | 8/2015 | Du ............... G06F 21/32 726/7 |
| 2015/0264567 A1 | 9/2015 | Sensharma et al. |
| 2015/0349959 A1 | 12/2015 | Marciniak |
| 2015/0363582 A1* | 12/2015 | Sheller ............... G06F 21/31 726/17 |
| 2017/0035327 A1* | 2/2017 | Yuen ............... G06F 3/017 |
| 2019/0266374 A1* | 8/2019 | Lee ............... G06F 3/167 |

* cited by examiner

| Sensor | | GPS Receiver | Gyroscope | Velocimeter | Rotation Vector Sensor | Accelerometer | Light sensor | Proximity Sensor | Orientation Sensor | Gravity Sensor | Touch Panel |
|---|---|---|---|---|---|---|---|---|---|---|---|
| Action A | Hold a cell-phone to user's ear | | X | X | X | X | | X | X | | |
| Action B | Tap a finger | | X | X | | X | | | | | X |
| Action C | Walk | X | X | X | X | X | | | X | | |
| Action D | Sit and Stand | | X | X | X | X | X | | X | | |
| Action E | Flip a cell-phone | | X | X | X | X | X | | X | | |
| Action F | Occlude a light sensor | | X | | | | X | X | | | |
| Action G | Touch a predetermined position on a touch panel | | X | X | | | | X | | | X |

| Situation A | In a predetermined position (Office or Home, Floor) |
| Situation B | Moving (walking, driving or being on a train) or stopping |
| Situation C | Authentication failure history (failure count) |
| Situation D | In light place or dark place |
| Situation E | Objective of authentication |

METHOD AND SYSTEM FOR AUTHENTICATING A USER USING A MOBILE DEVICE HAVING PLURAL SENSORS

CROSS-REFERENCES TO RELATED APPLICATIONS

This application is a continuation of U.S. patent application Ser. No. 15/799,381 filed on Oct. 31, 2017, the entire content of which is incorporated herein by reference.

FIELD OF THE INVENTION

The present disclosure relates to a method and system for authenticating a user using a mobile device having plural sensors, and more particularly, a method and system for authenticating a user using a mobile phone having plural sensors, for example, to access a home or office, access to a device or service, for example, an application hosted on the mobile device, an image forming apparatus or printer, or a WiFi access point for access to company Internet or Intranet, and for transacting business, for example, transferring money from a bank account or the like.

BACKGROUND OF THE INVENTION

Current Information Technology (IT) environment utilize many techniques to authenticate a user, such as, for example, using proximity cards, RFID cards, ID/Passwords, various biometric information, Smart cards, RSA tokens, and in some cases advanced methods like IRIS recognition, face detection, and voice recognition. The current methods may create a secure system but also has limitations and add burden on the user to remember and/or save secure information like PINs, passwords, challenge questions, and/or pictures.

However, most individuals have a mobile device, for example, a cell phone or a smart phone on their possession with them if not at all times, but during the majority of the day, for example, while at work. Accordingly, an alternative to the current methods and techniques, it would be desirable to authenticate a user using a mobile device, for example a cell phone or smart phone having plural sensors. For example, in accordance with an exemplary embodiment, the plural sensors can detect situations (or location) of the mobile device and user, and actions performed by the user with the mobile device for authentication purposes.

SUMMARY OF THE INVENTION

Accordingly, it would be desirable to have a system or method, which can authenticate a user having a mobile device with plural sensors for both situations (for example, positions) and actions.

A method is disclosed for authenticating a user having a mobile device with plural sensors, the method comprising: recognizing a situation of the mobile device or the user; determining if the situation of the mobile device or the user is a predetermined situation; when the situation is the predetermined situation: determining a first action as an authentication action; determining a single sensor or a first combination of sensors among the plural sensors; and executing a first authentication for the user by using the single sensor or the first combination of sensors; and when the situation is not the predetermined situation: determining a second action as the authentication action; determining a second combination of sensors among the plural sensors; and executing a second authentication for the user by using the second combination of sensors.

A method is disclosed for authenticating a user having a mobile device with plural sensors, the method comprising: determining a first action as an authentication action; recognizing a situation of the mobile device or the user; determining if the situation of the mobile device or the user is a predetermined situation; when the situation is the predetermined situation: determining a single sensor or first combination of sensors among the plural sensors to execute the first action; and executing a first authentication for a user using the single sensor or the first combination of sensors, when the situation is not the predetermined situation: determining a second combination of sensors among the plural sensors to execute the first action; and executing a second authentication for the user using the second combination of sensors.

A method is disclosed for authenticating a user having a mobile device with plural sensors, the method comprising: recognizing a situation of a mobile device or the user; determining if the situation is a predetermined situation; when the situation of the mobile device or the user is the predetermined situation: determining a first action as an authentication action; determining a single or first combination of sensors among the plural sensors; and executing a first authentication for a user by using the single or first combination of sensors; and when the situation of the mobile device or the user is not the predetermined situation: determining a second action as the authentication action; determining a second action as an authentication action corresponding to the mobile device; determining a second combination of sensors among the plural sensors; determining a wearable device to be used for authentication; determining a third action as an authentication action corresponding to the wearable device; determining a single or third combination of sensors in the wearable device; and executing a second authentication for a user by using the second combination of sensors and the single or third combination of sensors in the wearable device.

A method is disclosed for authenticating a user having a mobile device with plural sensors, the method comprising: enrolling the user of the mobile device into an authentication program, the enrollment of the user of the mobile device into the authentication program including requesting the user to perform a series of actions with the mobile device, each of the series of actions incorporating one or more of the plural sensors of the mobile device and the series of actions including at least a first action and a second action; recognizing a situation of the mobile device or the user; determining if the situation of the mobile device or the user is a predetermined situation; when the situation is the predetermined situation: determining the first action as an authentication action; determining a single sensor or a first combination of sensors among the plural sensors; and executing a first authentication for the user by using the single sensor or the first combination of sensors; when the situation is not the predetermined situation: determining the second action as the authentication action; determining a second combination of sensors among the plural sensors; and executing a second authentication for the user by using the second combination of sensors; and incorporating a machine-learning program or algorithm into the authentication program to reduce or increase a level of authentication for the mobile device and the user based on previous authentication requests for a same or a similar service or request.

A method is disclosed for authenticating a user having a mobile device with plural sensors, the method comprising: enrolling the user of the mobile device into an authentication program, the enrollment of the user of the mobile device into the authentication program including requesting the user to perform a series of actions with the mobile device, each of the series of actions incorporating one or more of the plural sensors of the mobile device; determining a first action as an authentication action; recognizing a situation of the mobile device or the user; determining if the situation of the mobile device or the user is a predetermined situation; when the situation is the predetermined situation: determining a single sensor or first combination of sensors among the plural sensors to execute the first action; and executing a first authentication for a user using the single sensor or the first combination of sensors; when the situation is not the predetermined situation: determining a second combination of sensors among the plural sensors to execute the first action; and executing a second authentication for the user using the second combination of sensors; and incorporating a machine-learning program or algorithm into the authentication program to reduce or increase a level of authentication for the mobile device and the user based on previous authentication requests for a same or a similar service or request.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

FIG. 5 is a chart illustrating a plurality of actions and corresponding sensors on a mobile device, which can be used to identify one or more of the plurality of actions.

DESCRIPTION OF THE PREFERRED EMBODIMENTS

Figure 1:
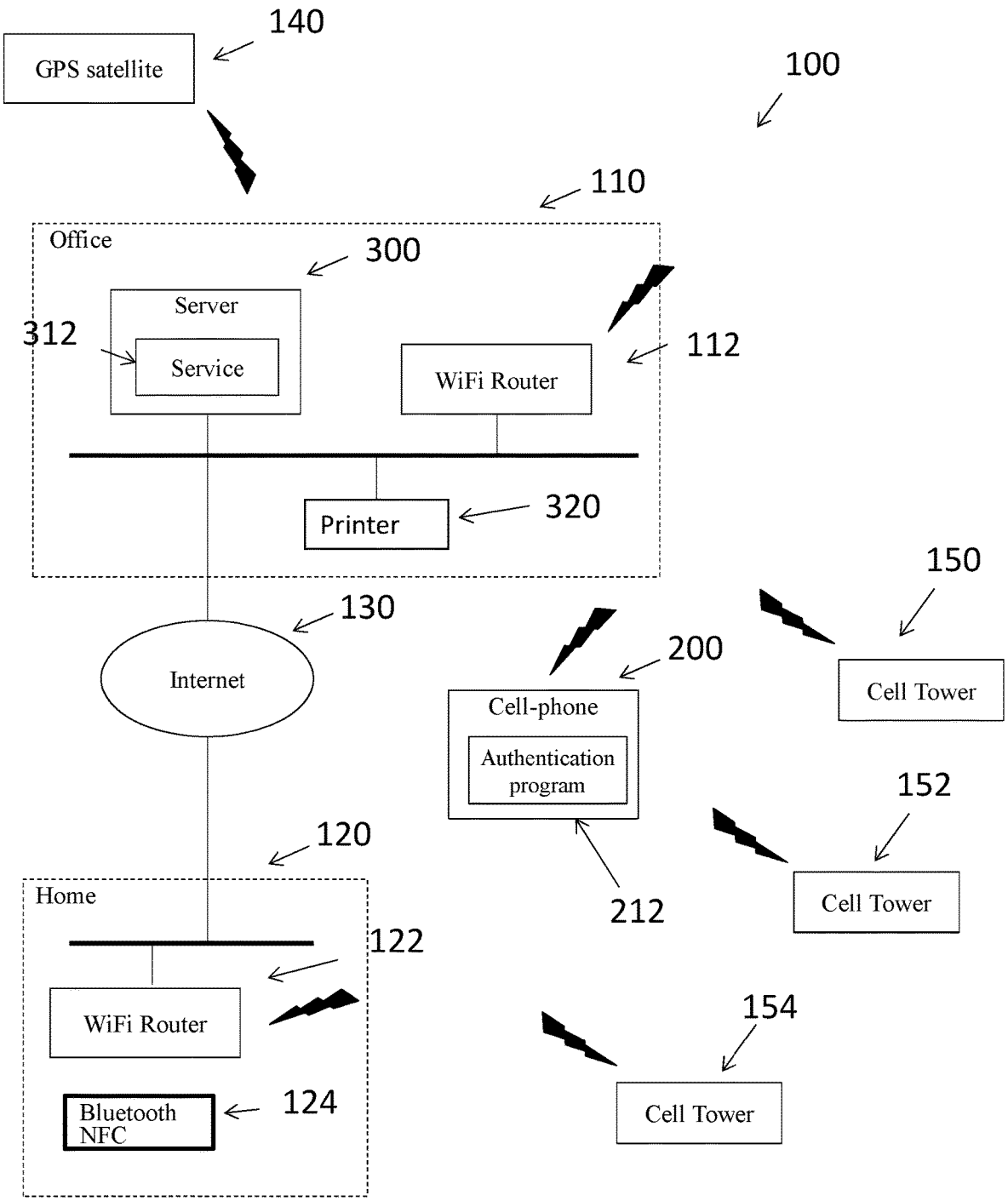
FIG. 1 is an illustration of a system in which a user of a mobile device having plural sensors can be authenticated in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is an illustration of a system 100 in which a user of a mobile device 200 having plural sensors 220 can be authenticated in accordance with an exemplary embodiment. As shown in FIG. 1, the system 100 can include, for example, an office 110 having a WiFi (wireless local area networking) router 112, a server 300, and a printer 320, and a home 120 having a WiFi router 122. The WiFi routers 112, 122 can be configured for wireless local area networking based on, for example, the IEEE 802.11 standards. For example, the WiFi routers 112, 122 can receive data packets from the mobile device 200 and route the data packets to the server 300 or alternatively, through the Internet 130 to the home 120, or from the home 120 to the office 110. In addition to WiFi, the office 110, the home 120, the mobile device 200, and the wearable device 1400 (FIGS. 13 and 14) can exchange data through any known communication protocol 124, for example, Bluetooth® and near field communication (NFC).

In accordance with an exemplary embodiment, a communication network (or Internet) 130 connects the office 110 and the home 120 to one another. The system 100 can also include a GPS (global positioning system) satellite 140, a mobile device (or cell phone) 200, and one or more cell towers 150, 152, 154. In accordance with an exemplary embodiment, the server 300 can include an application or service 312, which can be accessed upon authentication of the user via the mobile device 200 as disclosed herein.

In accordance with an exemplary embodiment, the office 110 and the home 120 are preferably connected via the Internet or a communication network (or network) 130. The communication network 130 may include, for example, a conventional type network, wired or wireless, and may have any number of configurations, such as a star configuration, token ring configuration, or other known configurations. The communication network 130 may include one or more local area networks ("LANs"), wide area networks ("WANs") (e.g., the Internet), virtual private networks ("VPNs"), peer-to-peer networks, near-field networks (e.g., Bluetooth®), cellular networks (for example, 3G, 4G, other generations), and/or any other interconnected data path across which multiple computing nodes may communicate.

In accordance with an exemplary embodiment, the printer 320 can be a multi-function peripheral (MFP), a laser beam printer (LBP), an LED printer, a multi-function laser beam printer including copy function. In accordance with an exemplary embodiment, the printer 320 can be configured as a multi-function peripheral (MFP) device or all-in-one (AIO) that can include a printer section for converting print data inputted from outside to image data and forming and printing out the converted image onto a printable media, a scanner section for optically reading a document (for example, an image recognition system), and a facsimile section for facsimile receiving and transmitting image data to and from external apparatuses through public telecommunication lines. For example, in accordance with an exemplary embodiment, access to the printer 320 can be provided to a user upon authentication via the mobile device 200 as disclosed herein.

In accordance with an exemplary embodiment, data may be transmitted in encrypted or unencrypted form between the office 110, the home 120, and the mobile device 200 using a variety of different communication protocols including, for example, various Internet layer, transport layer, or application layer protocols. For example, data may be transmitted via the network 130 using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), file transfer protocol (FTP), WebSocket (WS), wireless access protocol (WAP), various messaging protocols (SMS, MMS, XMS, IMAP, SMTP, POP, WebDAV, etc.), or other known protocols.

Figure 2:
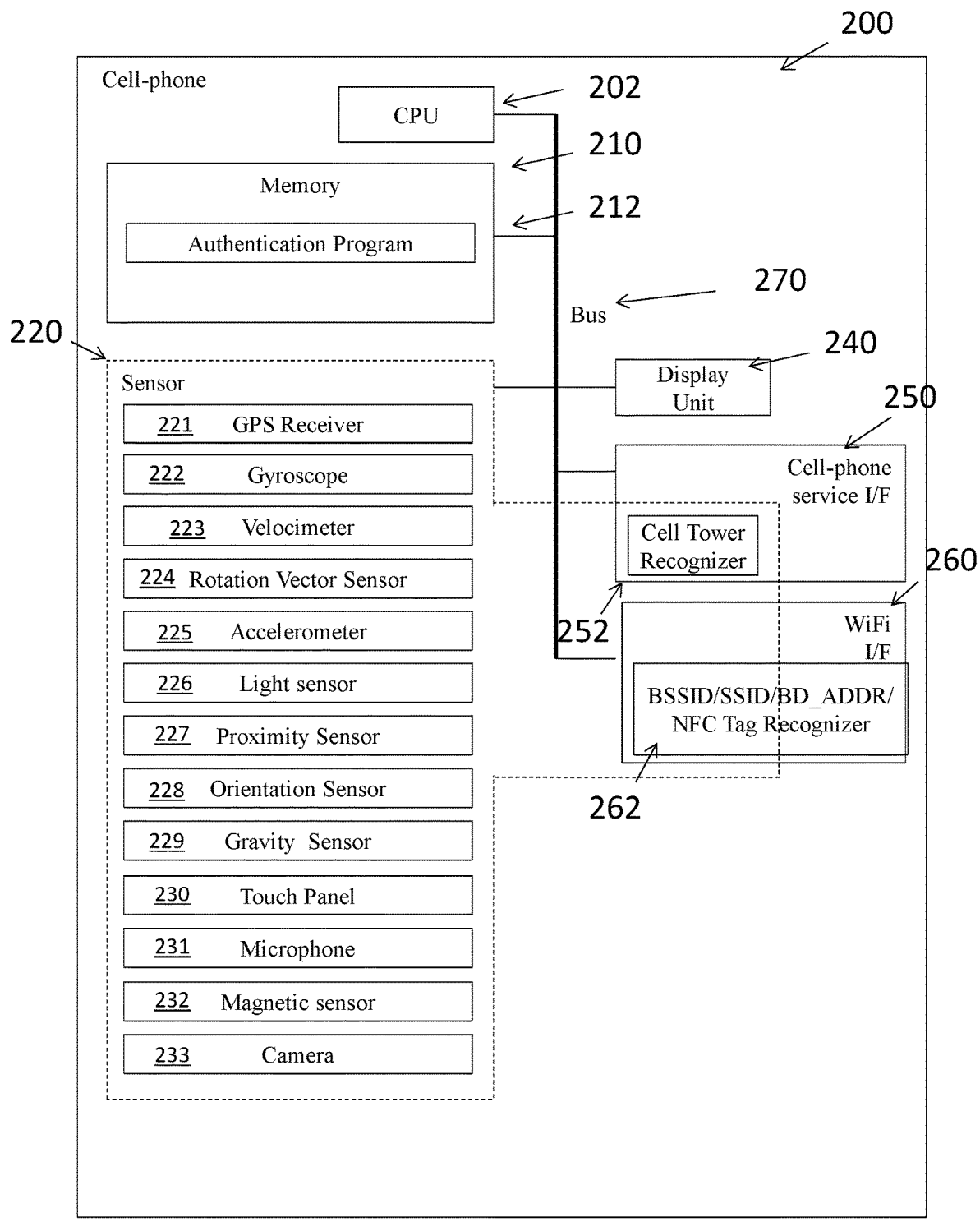
FIG. 2 is an illustration of a mobile device having plural sensors in accordance with an exemplary embodiment.

FIG. 2 is an illustration of a mobile device 200 having plural sensors in accordance with an exemplary embodiment. In accordance with an exemplary embodiment, the mobile device 200 can be a cell phone, a smart phone, or similar type device, which includes, for example, a personal computer with a mobile operating system. As shown in FIG. 2, the mobile device 200 can include a computer-processing unit (CPU) 202, a memory 210, which can include an authentication program 212, a plurality of sensors 220, a display unit 240, a cell-phone service I/F (interface) 250, and a WiFi I/F 260. A bus 270 connects the CPU 202, the memory 210, the plurality of sensors 220, the display unit 240, the cell-phone service I/F 250, and the WiFi I/F 260 to one another within the mobile device 200.

In accordance with an exemplary embodiment, the processor or CPU 202 carries out the instructions of a computer program, which operates and/or controls at least a portion of the functionality of the mobile device 200. The mobile device 200 can also include an operating system (OS), which manages the computer hardware and provides common services for efficient execution of various software programs. For example, the authentication programs (authentication application) 212 can include application software, for example, for authenticating a user to access a home or office, access a device or service, for example, an image forming apparatus or WiFi access point for access to company Internet or Intranet, or for transacting business, for example, transferring money from a bank account or the like.

Figure 9:
FIG. 9 is a chart illustrating a plurality of situations in which a mobile device can be used for authenticating a user in accordance with an exemplary embodiment.

In accordance with an exemplary embodiment, the authentication program 212 is hosted on the mobile device 200 in the form an application program or software module configured to execute the process as disclosed herein to authenticate a user having a mobile device with plural sensors. In accordance with an exemplary embodiment, the authentication program 212 can include a registration or enrollment component in which the user can be asked to enter his or her personal data or information, which identifies the users, for example, position or location information related to the users place of employment including addresses of offices in which the user may work, residential address. In addition, during the enrollment process, the user may be asked to enter information about services in which the user may wish to have access via the authentication program 212. For example, information related to a plurality of situations 900, for example, as shown in FIG. 9 can be input into the authentication program 212 of the mobile device for the user. The user can also be asked to perform a series of actions as disclosed herein to teach or train the authentication program 212 certain traits or actions of the user for authentication purposes and which actions are unique to the user. In accordance with an exemplary embodiment, for enrollment purposes, the user may be requested or asked to perform a plurality of actions 500, for example, as shown in FIG. 5, with his or her mobile device 200. For example, the display unit 240 can depict a series of actions during the enrollment process in which one or more actions can be determined.

In accordance with an exemplary embodiment, the authentication program 212 is configured to perform the enrollment process and the authentication phase as disclosed herein. Once the user has been enrolled, the authentication program 212 authenticates the user by comparing the data or information, which identifies the user for authentication purposes and the position, situation, or actions of the mobile device 200 and the user as set forth herein. For example, in accordance with an exemplary embodiment, the authentication program 212 can authenticate the user of the mobile device 200 depending on the nature or type of services or authentication requested, and wherein each type of service or authentication request has a corresponding authentication level (or level of confidence) that the mobile device 200 and user is the actual user. For example, access to WiFi can be a lower authentication requirement level (i.e., a lower confidence level) than access personal or financial records of a company or individual, which can require a higher level of authentication (i.e., a higher confidence level). In addition, the authentication program 212 can include a machine-learning program or algorithm to reduce or increase the level of authentication requirement (or confidence level) based on, for example, previous authentication requests for a same or similar service or request.

In accordance with an exemplary embodiment, as an initial requirement, the authentication program 212 can include at least one position or action for each user and/or for each service, for example, obtaining access to a home, a building, or an office, and/or unlocking access to, or accessing devices, systems, or applications, which can include, for example, software applications, databases or database management systems, and/or machines, for example, medical equipment, x-ray machines, and scanners.

In accordance with an exemplary embodiment, depending upon the service access location, a plurality of actions or situations can be required depending on the location of the user and mobile device 200. For example, in accordance with an exemplary embodiment, different actions or situations can be required to authenticate the user depend on one or more of the following: if the user is walking or stopped, an authentication history, for example, failure count or number of attempts to access a certain service, ambient light conditions, for example, if the mobile device in a light or dark place, and an objective of the authentication, for example, the type of services being requested by the user.

In accordance with an exemplary embodiment, for example, a user wishing to access a service at one time of day may require a single action for authentication. However, the same user wishing to access the service at a different time of day, or from an unknown position or location, may be required to execute a second action, which may require a plurality of sensors within the mobile device 200 to authenticate the user for access to the requested service.

In accordance with an exemplary embodiment, the plurality of sensors 220 on the mobile device 200 are only examples of sensors that can be used and is not meant to limit the type or number of sensors, which can be used to authenticate the user. For example, the plurality of sensors 220 can include, for example, a GPS (global positioning system) receiver 221, a gyroscope 222, a velocimeter 223, a rotation vector sensor 224, an accelerometer 225, a light sensor 226, a proximity sensor 227, an orientation sensor 228, a gravity sensor 229, a touch panel 230, a microphone 231, a magnetic sensor 232, and a camera 233. It should be noted that the system and method as disclosed herein can be implemented with any mobile device 200 having at least one sensor 220, and preferably, two or more sensors 220. For example, if the user has an older mobile device 200, which does not have each of the plurality of sensors 220 as shown in FIG. 2, the authentication program 212 can be programmed to utilize only those sensors 220 available on the mobile device 200 of the user.

In accordance with an exemplary embodiment, the GPS receiver 221 is capable of receiving information from a GPS satellite 140 and then calculates the mobile device's 200 geographical position. For example, in accordance with an exemplary embodiment, the GPS receiver 221 can calculate the position of the mobile device's latitude and longitude.

In accordance with an exemplary embodiment, the gyroscope 222 can measure orientation and angular velocity of the mobile device 200. For example, in accordance with an exemplary embodiment, the gyroscope 222 can detect the mobile device's current turning radius in an x, y, and z directions. In accordance with an exemplary embodiment, for example, the x, y, and z directions (or axes) can correspond to the lateral or width (i.e., x-axis), the vertical or height (i.e., y-axis), where the vertical direction is a position or direction perpendicular to the plane of the horizon, i.e., up and down, and depth (i.e., z-axis).

In accordance with an exemplary embodiment, the velocimeter 223 is a sensor that can measure and calculating an instantaneous speed of the mobile device 200. For example, in accordance with an exemplary embodiment, the velocimeter 223 can detect the mobile device's velocity in the x, y, and z directions.

In accordance with an exemplary embodiment, the rotation vector sensor 224 is a device, which can detect rotation of the mobile device 200 in the x, y, and z directions.

In accordance with an exemplary embodiment, the accelerometer 225 is a device that measures proper acceleration, and wherein proper acceleration (or rate of change of velocity) of a body in its own instantaneous rest frame. In accordance with an exemplary embodiment, the accelerometer 225 can be used to detect and monitor vibrations in the mobile device 200, for example, during human activities such as walking or running.

In accordance with an exemplary embodiment, the light sensor 226 can be, for example, a photosensor or photodetector that detects light or other electromagnetic energy, for example, for the detection of ambient light level. For example, the photo detector can have a p-n junction that converts light photons into current. The junction can be covered by an illumination window having an anti-reflective coating. The absorbed photons make electron-hole pairs in the depletion region.

In accordance with an exemplary embodiment, the proximity sensor 227 is a device that can detect a distance from the mobile device 200, for example, to a hand or head of a user.

In accordance with an exemplary embodiment, the orientation sensor 228 is a device configured to detect, for example, pitch, roll, and azimuth. For example, in accordance with an exemplary embodiment, the orientation sensor 228 can be a compass like device or application.

In accordance with an exemplary embodiment, the gravity sensor 229 measures the acceleration effect of Earth's gravity on the mobile device 200. In accordance with an exemplary embodiment, the force can be detected in the y direction (for example, downward) of the mobile device 200.

In accordance with an exemplary embodiment, the touch panel (or touchscreen) 230 is preferably an input and output device layered on an upper or outer surface of the mobile device 200 in which the user can give input or control the information processing system through gestures by touching the screen with a stylus or one or more fingers of a user.

In accordance with an exemplary embodiment, the microphone 231 is preferably a transducer configured to convert sounds into an electrical signal.

In accordance with an exemplary embodiment, the magnetic sensor 232 is a device or application within the mobile device 200 that can detect a magnetic field strength in the x, y, and z directions.

In accordance with an exemplary embodiment, the camera 233 is an optical instrument within the mobile device 200 for recording or capturing images, which may be stored locally, transmitted to another location, or both.

In accordance with an exemplary embodiment, the display 240 is preferably a touch panel or touch screen on an outer surface of the mobile device 200, which is configured to present information in visual, or a tactile form, for example, tactile electronic displays for blind people.

In accordance with an exemplary embodiment, the mobile service I/F (or cell-phone I/F) 250 is configured to receive and send cellular data or communication between the mobile device 200 and one or more of the cell towers 150, 152, 154. In accordance with an exemplary embodiment, the mobile device 200 can also include cell tower recognizer 252, which is configured to recognize the one or more cell towers 150, 152, 154, in which the mobile device 200 may be in communication.

In accordance with an exemplary embodiment, the mobile device 200 has a WiFi I/F (WiFi interface) 260, which is configured to receive and send data between the mobile device 200 and the WiFi router 112, 122 within the office 110 or home 120, respectively. For example, in accordance with an exemplary embodiment, the mobile device 200 can have an ID recognizer 262, which directs data between the mobile device 200 and WiFi routers 112, 122, and the Internet 130. The ID recognizer 262 can be, for example, a BSSID basic service set identifier (BSSID), a service set identifier (SDID), a Bluetooth Device Address (BD_ADDR), and/or a near-field communication tag (NFC tag).

In accordance with an exemplary embodiment, each of the one or more $1^{st}$ actions, $2^{nd}$ actions, or $3^{rd}$ actions as disclosed, for example, as shown in FIGS. 7, 10, 11, 12, 15, and 16, can be provided to the user of the mobile device 200 via a message, for example, a text message, displayed on the display unit 240 of the mobile device, an visual illustration of action to be performed on the display unit 240, and/or via an output from the microphone (or speaker) 231 of the mobile device 200. Alternatively, for example, during the enrollment process, the user of the mobile device 200 can be instructed on how to perform one or more the or more $1^{st}$ actions, $2^{nd}$ actions, or $3^{rd}$ actions, which may be requested during the authentication process as disclosed herein.

Figure 3:
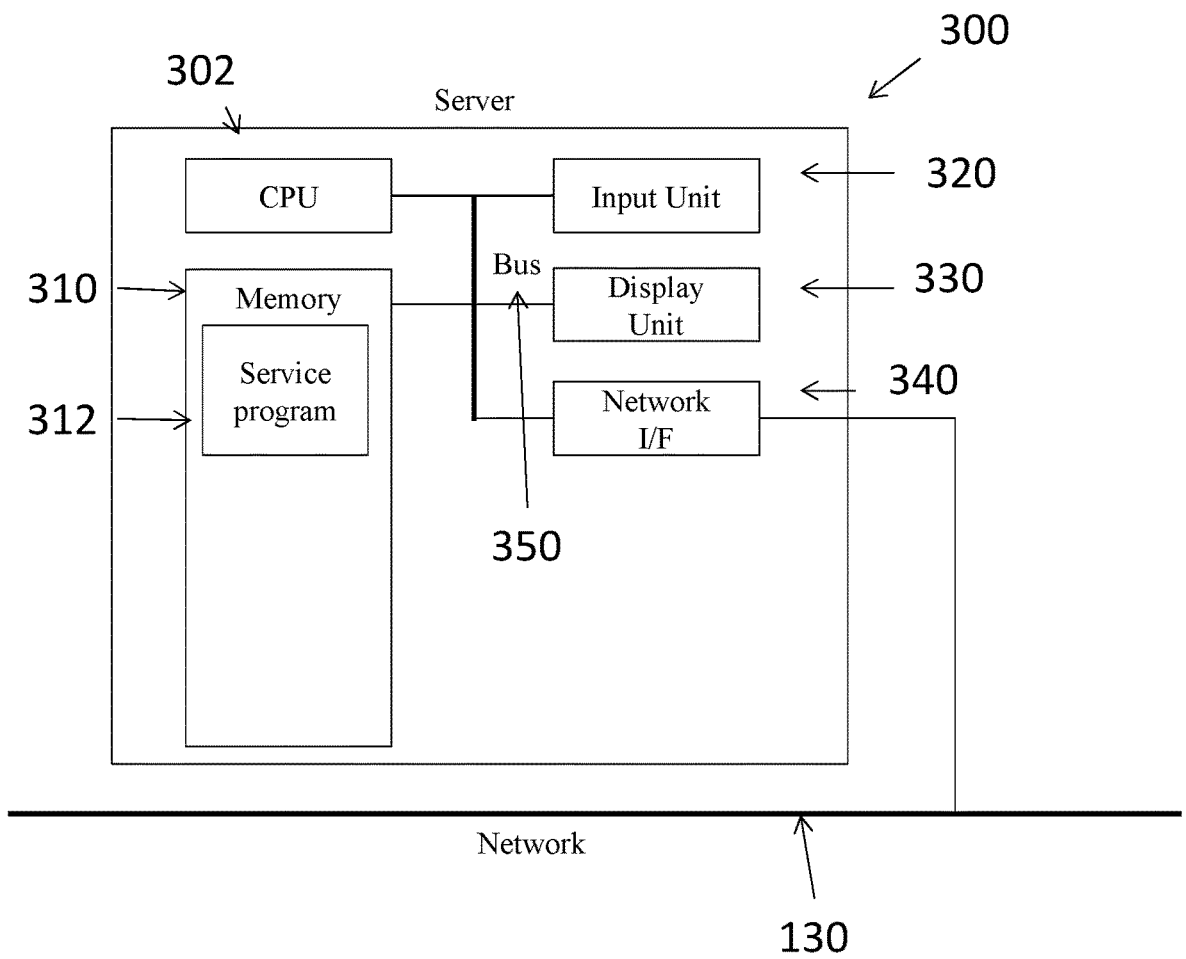
FIG. 3 is an illustration of a server in accordance with an exemplary embodiment.

FIG. 3 is an illustration of a server 300 in accordance with an exemplary embodiment. In accordance with an exemplary embodiment, the server (or authentication server) 300 can include a processor or central processing unit (CPU) 302, one or more memories 310 for storing software programs and data, for example, a service program 312, an input unit 320, a display unit (or graphical user interface) 330, and network interface (network I/F) 340, which is connected to the communication network (or network) 130. A bus 350 connects the CPU 302, the one or more memories 310 and the service program 312, the input unit 320, the display unit 330, and the network I/F 340 to one another.

In accordance with an exemplary embodiment, the processor or CPU 302 carries out the instructions of a computer program, which operates and/or controls at least a portion of the functionality of the at least one server 300. The server 300 can also include an operating system (OS), which manages the computer hardware and provides common services for efficient execution of various software programs.

In accordance with an exemplary embodiment, the service program (or services) 312 can include, for example, access to the office 110 (or home 120), access to printing services, for example, a printer 320 within the office 110, access to a device or service, for example, an application hosted on the server 300, an image forming apparatus or printer, or a WiFi access point for access to company Internet or Intranet, and for transacting business, for example, transferring money from a bank account or the like.

Figure 4:
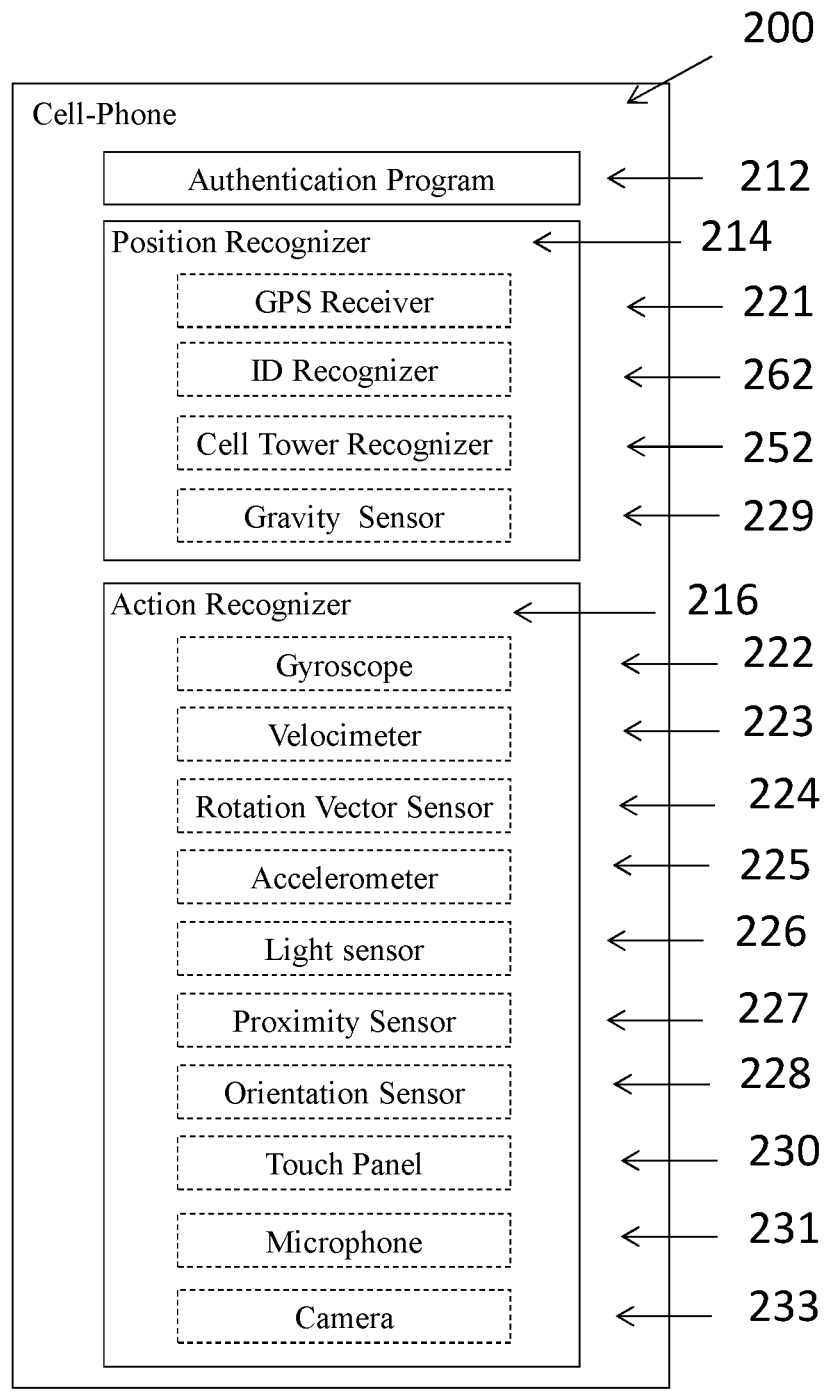
FIG. 4 is an illustration of a mobile device having plural sensors and corresponding sensors which can be used for recognizing position and action of the mobile device in accordance with an exemplary embodiment.

FIG. 4 is an illustration of a mobile device 200 having plural sensors 220 and corresponding sensors 220 which can be used for recognizing position and action of the mobile device 200 in accordance with an exemplary embodiment. As shown in FIG. 4, the mobile device 200 can include an authentication program 212, which is preferably an application hosted on the mobile device 200, which can authenticate the user of the mobile device 200 using a plurality of sensors 220 of the mobile device 200. In accordance with an exemplary embodiment, the authentication program 212 can be configured to receive a plurality of inputs from the plurality of sensors 220, which can relate to a position of the mobile device 200 (position recognizer 214), a situation of the mobile device 200 (situation recognizer 215 (FIG. 8)), or an action of the mobile device 200 (action recognizer 216).

For example, in accordance with an exemplary embodiment, the plurality of sensors 220 on the mobile device 200, which can be used to identify or determine a position or location of the mobile device 200 can include, for example, the GPS receiver 221, the ID recognizer 262, the cell tower recognizer 252 and the gravity sensor 229. In addition, the plurality of sensors 220 on the mobile device 200, which can be used to identify or determine an action of the mobile device 200 and/or user, can include the gyroscope 222, the velocimeter 223, the rotation vector sensor 224, the accelerometer 225, the light sensor 226, the proximity sensor 227, the orientation sensor 228, the touch panel 230, the microphone 231, and the camera 233.

FIG. 5 is a chart illustrating a plurality of actions 500 and corresponding sensors 220 on a mobile device 200, which can be used to identify one or more of the plurality of actions 500. For example, as shown in FIG. 5, the actions 500 can include holding a cell phone (or mobile device) 200 to a user's ear (Action A), tapping a finger (Action B), walking (Action C), sitting or standing (Action D), flipping a cell phone (or mobile device) 200 (Action E), occluding a light sensor (Action F), and touching a predetermined position on a touch panel or screen on the cell phone or mobile device 200 (Action G).

Figure 6A:
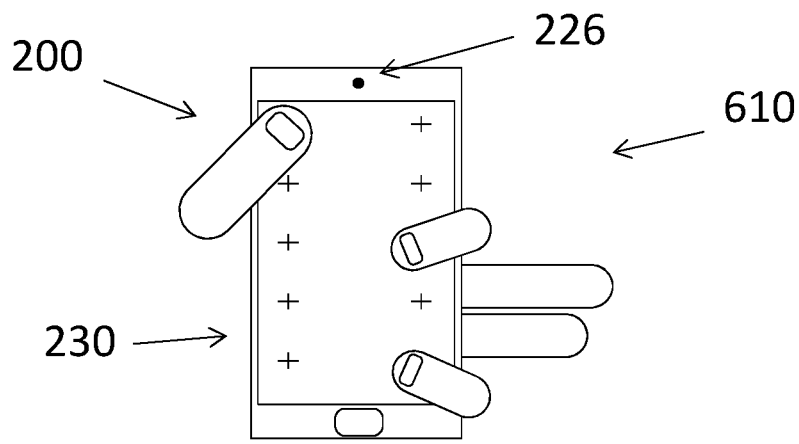
FIG. 6A is an illustration of an action of touching a predetermined position on a touch panel of a mobile device in accordance with an exemplary embodiment.

FIG. 6A is an illustration of an action 610 of touching a predetermined position on a touch panel or screen 230 of a mobile device 200 in accordance with an exemplary embodiment. As shown in FIG. 6A, for example, the action of touching the touch panel or screen 230 on the cell phone or mobile device 200 can include detection by one or more of the following sensors 220, the gyroscope 222, the velocimeter 223, and the proximity sensor 227, in addition to the touch panel 230. For example, the authentication program 212 can configured to recognize a user based on the certain pattern or configuration of the user's fingers in contact with the touch panel 230 and/or in combination with the gyroscope 222, the velocimeter 223, and the proximity sensor 227.

Figure 6B:
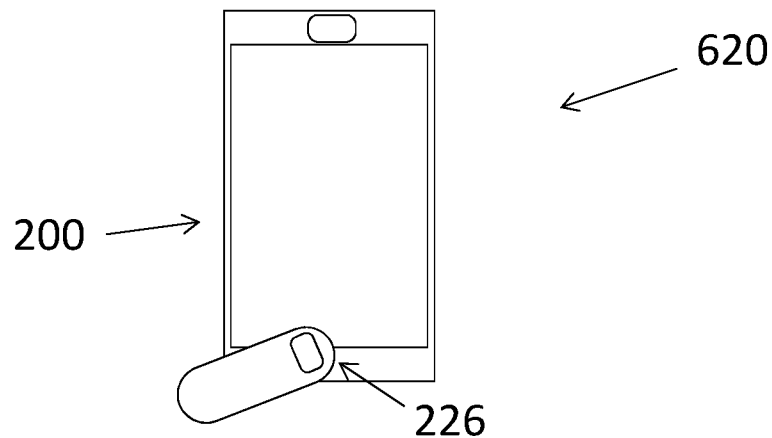
FIG. 6B is an illustration of an action of occluding a light sensor of a mobile device in accordance with an exemplary embodiment.

FIG. 6B is an illustration of an action 620 of occluding a light sensor 226 of a mobile device 200 in accordance with an exemplary embodiment. For example, the light sensor 226 can be occluded by placing one or more fingers of the user over the light sensor 226 (FIGS. 6A and 6B).

Figure 7:
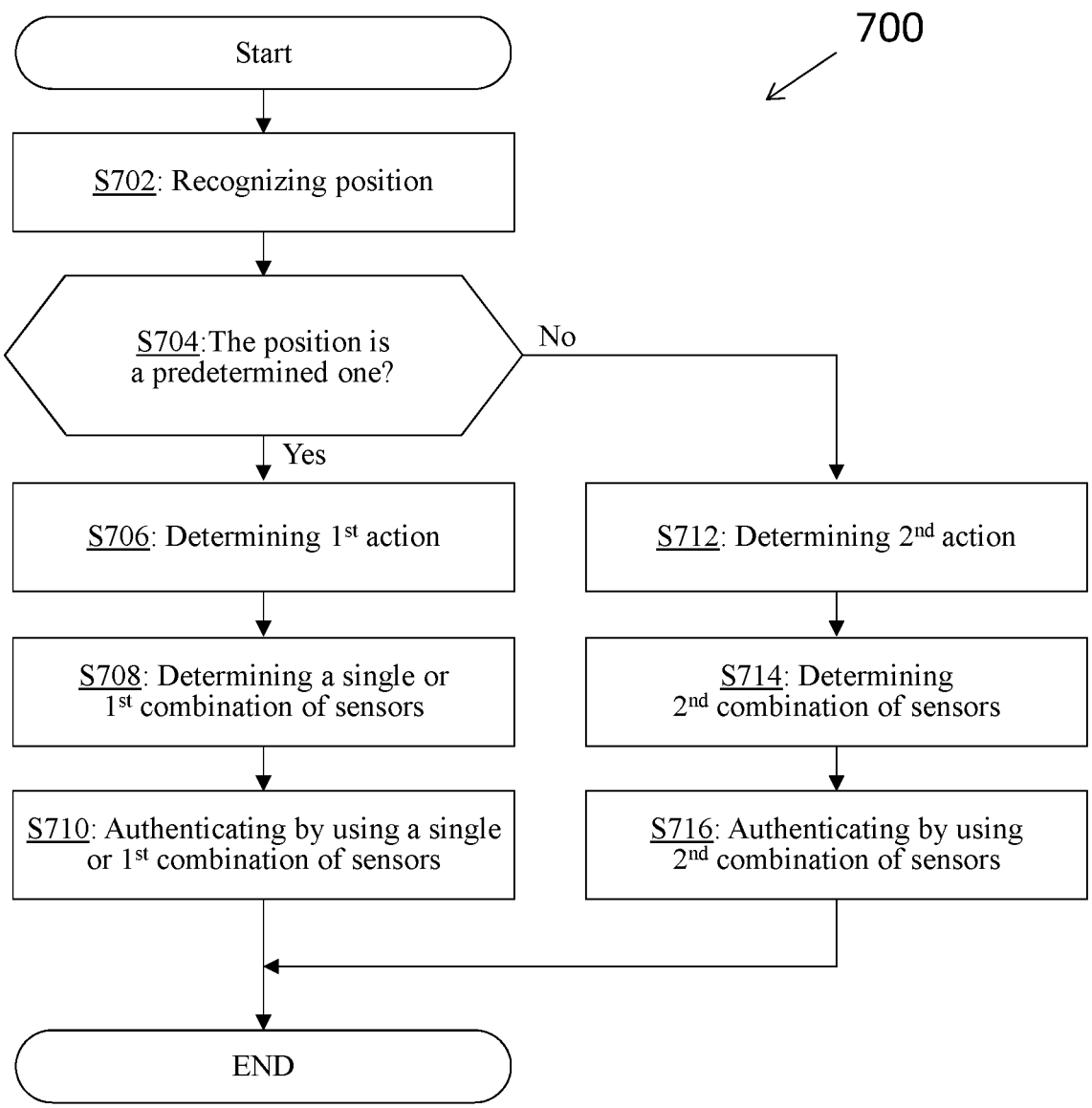
FIG. 7 is a flowchart illustrating a method and system for authenticating a user using a mobile device having plural sensors in accordance with an exemplary embodiment.

FIG. 7 is a flowchart 700 illustrating a method and system for authenticating a user using a mobile device 200 having plural sensors 220 in accordance with an exemplary embodiment. As shown in FIG. 7, in step S702, the authentication program 212 determines or recognizes a position of the mobile device 200 using at least one of the plurality of sensors 220. In step S704, the authentication program 212 determines if the position of the mobile device 200 is a predetermined (or known) location or position. In step S704, if the position is a predetermined (or known) location or position (i.e., "Yes"), the process continues to step S706 for determination of a first action ($1^{st}$ action). In step S708, a determination of the first action ($1^{st}$ action) can be determined based on a single or a $1^{st}$ combination of sensors. In step S710, the user of the mobile device 200 can be authenticated by using the single or the $1^{st}$ combination of sensors determined from step S708.

In accordance with an exemplary embodiment, in step S704, if the position of the mobile device 200 is not a predetermined (or known) location or position (i.e., "No"), the process continues to continues to step S712 for determination of a second action (2nd action). In step S714, the determination of the second action (2nd action) can be determined based on a $2^{nd}$ combination of sensors. In step S716, the user of the mobile device 200 can be authenticated by the 2$^{nd}$ combination of sensors determined from step S716.

In accordance with an exemplary embodiment, for example, when the mobile device 200 is not in a predetermined (or known) location or position (i.e., "No"), the authentication program 214 can require additional sensors 220 to authenticate the mobile device 200 and user. On the contrary, in a predetermined (or known) location or position (i.e., "Yes"), the number of sensors used to authenticate the mobile device 200 and user can be less than the number of sensors 220 used in the unknown (or not predetermined location). In addition, the position and/or type of actions and corresponding number of sensors 220 used in the mobile device 200 (or wearable device 1400) can also vary depending on the type of services requested. For example, access to a user's office or home can required a different level of authentication as compared to access a bank account and moving money to a different account.

In accordance with an exemplary embodiment, if the user or the mobile device 200 cannot execute or perform one or more of the required actions in any of the exemplary embodiments, authentication of the user can (and will) be denied, for example, for the requested authentication and corresponding access and/or services. For example, in steps S710 or S716, if the requested actions cannot be performed using the single, 1$^{st}$ combination of sensors, or the 2$^{nd}$ combination of sensors, the user will not be authenticated via the mobile device 200 and access to the requested services, etc. will be denied.

Figure 8:
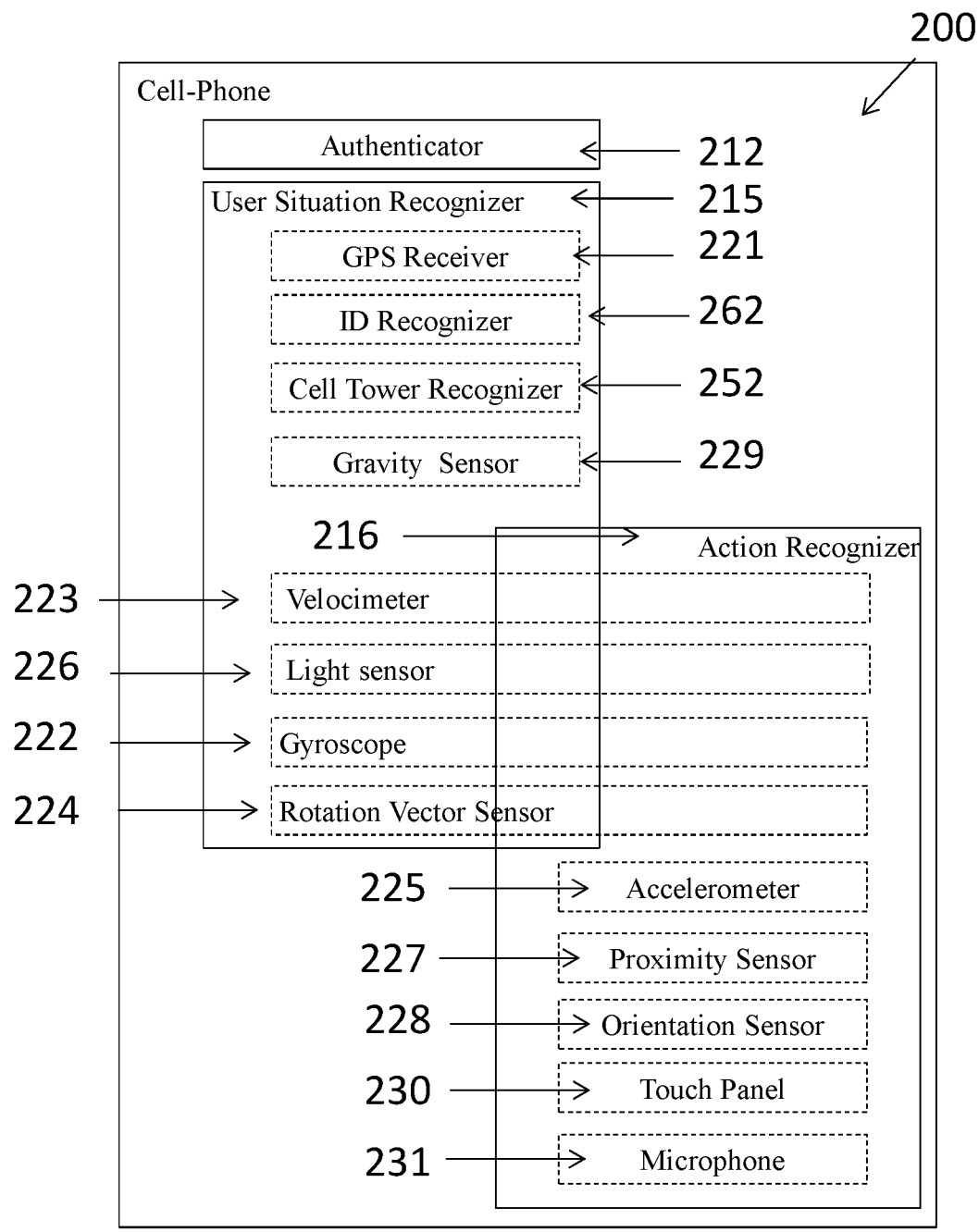
FIG. 8 is an illustration of a mobile device having plural sensors and corresponding sensors which can be used for recognizing a situation and an action of the mobile device in accordance with another exemplary embodiment.

FIG. 8 is an illustration of a mobile device 200 having plural sensors 220 and corresponding sensors 220 which can be used for recognizing a situation (for example, a position of the mobile device) and/or an action of the mobile device 200 in accordance with another exemplary embodiment. As shown in FIG. 8, the mobile device 200 can include an authentication program 212, which is preferably an application hosted on the mobile device 200, which can authenticate the user of the mobile device 200 using a plurality of sensors 220 of the mobile device 200. In accordance with an exemplary embodiment, the authentication program 212 can be configured to receive a plurality of inputs from the plurality of sensors 220, which can relate to a situation of the mobile device 200 (situation recognizer 215) or an action of the mobile device 200 (action recognizer 216).

For example, in accordance with an exemplary embodiment, the plurality of sensors 220 on the mobile device 200, which can be used to identify or determine a situation of the mobile device 200. In accordance with an exemplary embodiment, the situation of the mobile device 200 can be a position or a location of the mobile device 200. In accordance with an exemplary embodiment, the user situation recognizer 214 can determine the situation using, for example, the GPS receiver 221, the ID recognizer 262, the cell tower recognizer 252, the gravity sensor 229, the velocimeter 223, the light sensor 226, the gyroscope 222, and/or the rotation vector sensor 224.

In accordance with an exemplary embodiment, the plurality of sensors 220 on the mobile device 200 can be used to identify or determine an action of the mobile device 200 using the action recognizer 216, which as shown in FIG. 8, can include input from the following sensors 220: the gyroscope 222, the velocimeter 223, the rotation vector sensor 224, the accelerometer 225, the light sensor 226, the proximity sensor 227, the orientation sensor 228, the touch panel 230, and/or the microphone 231.

FIG. 9 is a chart illustrating a plurality of situations 900 in which a mobile device 200 can be used for authenticating a user in accordance with an exemplary embodiment. As shown in FIG. 9, the plurality of situations 900 can include, for example, Situation A, "in a predetermined position (Office or Home, Floor)", Situation B, "Moving (walk, drive or be on a train) or stopping", Situation C, "Authentication failure history (failure count)", Situation D, "In light place or dark place", or Situation E, "Objective of authentication".

In accordance with an exemplary embodiment, for example, after a user has failed to be authenticated after one or more time, the number of sensors 220 and/or the type of actions can be increased or changed.

Figure 10:
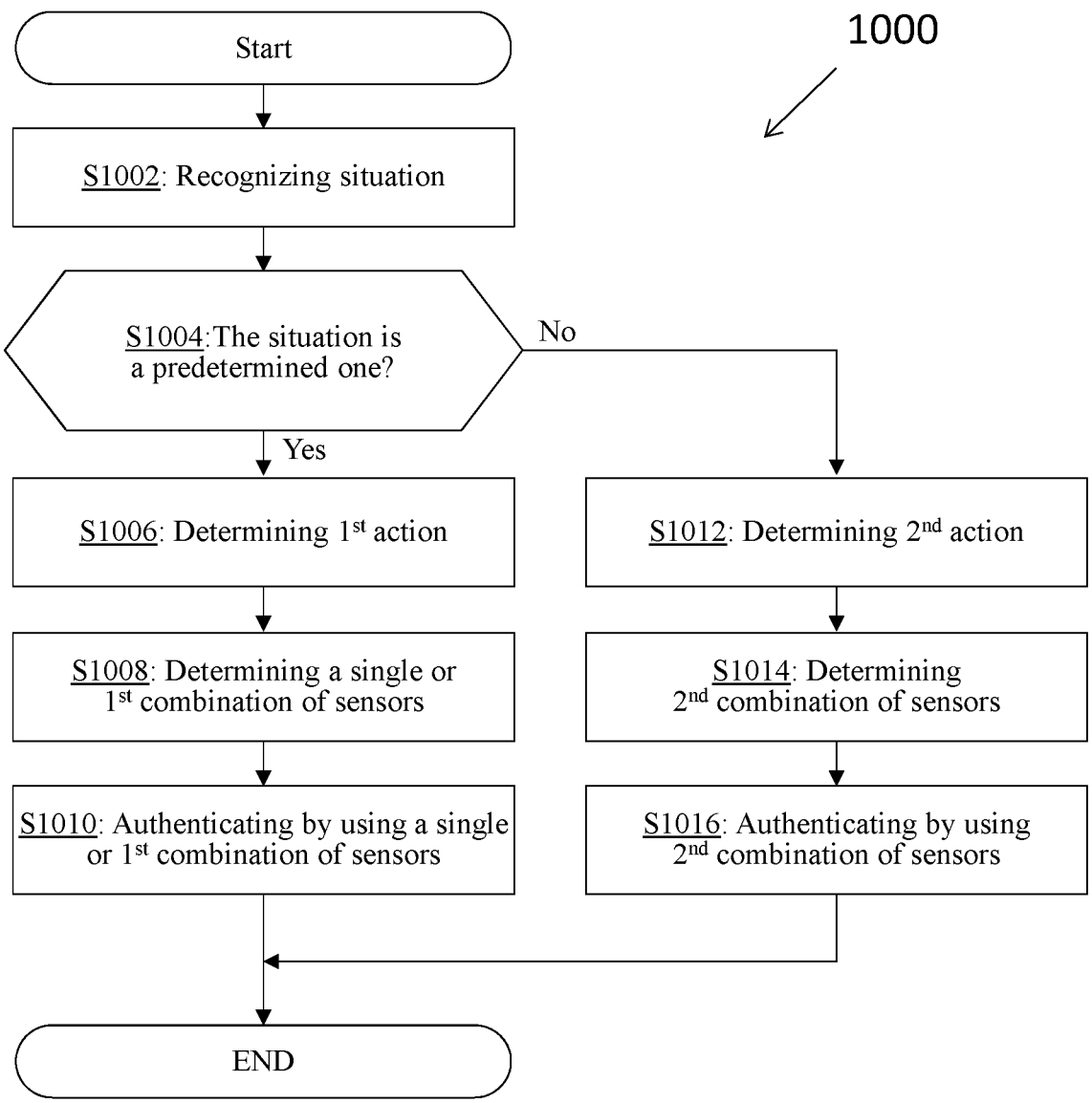
FIG. 10 is a flowchart illustrating a method and system for authenticating a user using a mobile device having plural sensors in accordance with another exemplary embodiment.

FIG. 10 is a flowchart 1000 illustrating a method and system for authenticating a user using a mobile device 200 having plural sensors in accordance with another exemplary embodiment. As shown in FIG. 10, in step S1002, the authentication program 212 determines or recognizes a situation 900 of the mobile device 200 using at least one of the plurality of sensors 220. In step S1004, the authentication program 212 determines if the situation of the mobile device 200 is a predetermined (or known) situation. In step S1004, if the situation is a predetermined (or known) situation (i.e., "Yes"), the process continues to step S1006 for determination of a first action (1$^{st}$ action). In step S1008, a determination of the first action (1$^{st}$ action) can be determined based on a single or a 1$^{st}$ combination of sensors. In step S1010, the user of the mobile device 200 can be authenticated by using the single or the 1$^{st}$ combination of sensors determined from step S1008.

In accordance with an exemplary embodiment, in step S1004, if the position of the mobile device 200 is not a predetermined (or known) situation (i.e., "No"), the process continues to step S1012 for determination of a second action (2nd action). In step S1014, a determination of the second action (2nd action) can be determined based on a 2$^{nd}$ combination of sensors. In step S1016, the user of the mobile device 200 can be authenticated by using the 2$^{nd}$ combination of sensors determined from step S1016.

In accordance with an exemplary embodiment, if the user or the mobile device 200 cannot execute or perform one or more of the required actions in any of the exemplary embodiments, authentication of the user can (and will) be denied, for example, for the requested authentication and corresponding access and/or services. For example, in steps S1010 or S1016, if the requested actions cannot be performed using the single, 1$^{st}$ combination of sensors, or the 2$^{nd}$ combination of sensors, the user will not be authenticated via the mobile device 200 and access to the requested services, etc. will be denied.

Figure 11:
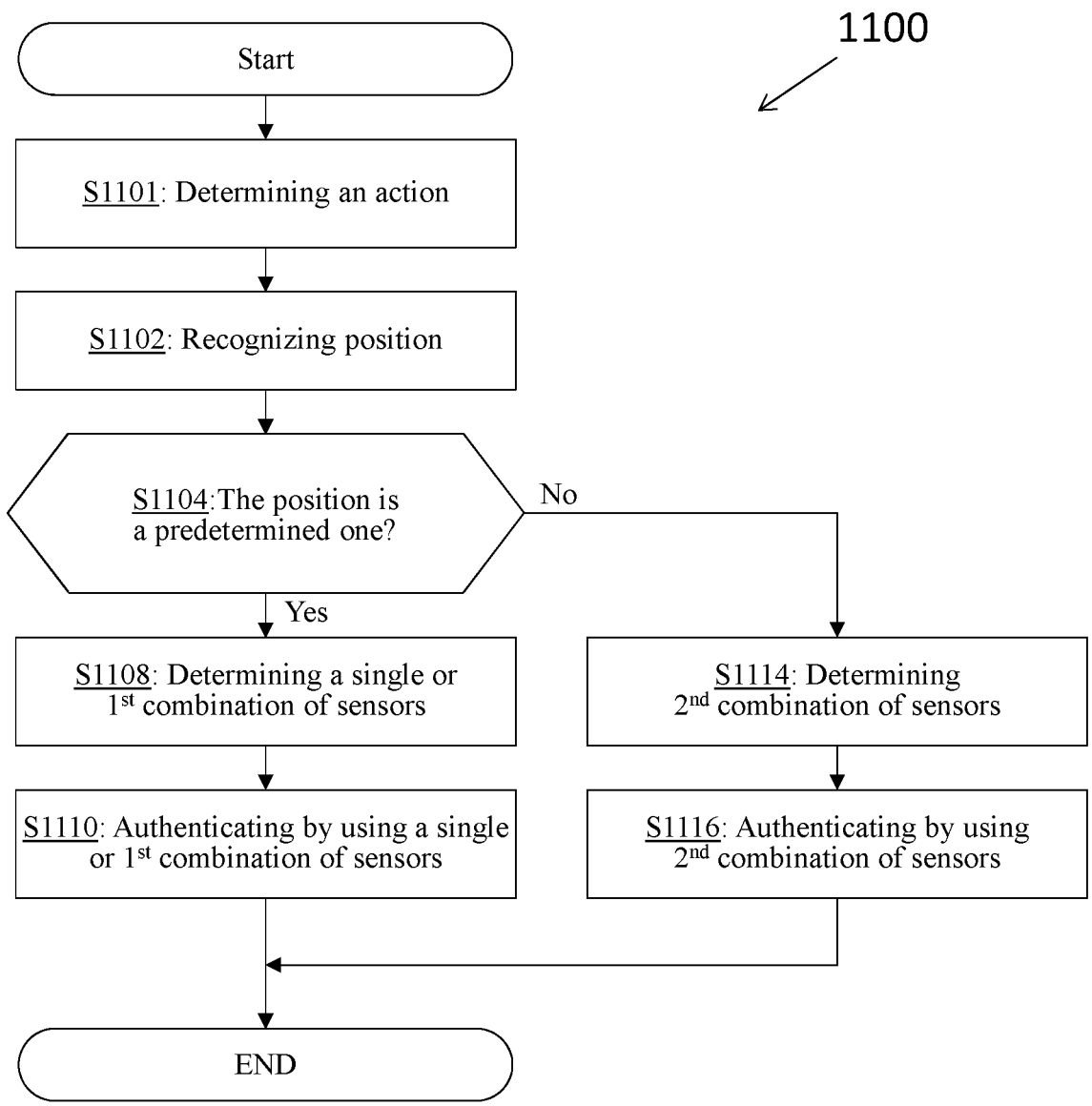
FIG. 11 is a flowchart illustrating a method and system for authenticating a user using a mobile device having plural sensors in accordance with a further exemplary embodiment.

FIG. 11 is a flowchart 1100 illustrating a method and system for authenticating a user using a mobile device 200 having plural sensors 220 in accordance with a further exemplary embodiment. As shown in FIG. 11, in step S1101, the authentication program 212 determines an action 900 performed by the mobile device 200. In step S1102, the authentication program 212 determines or recognizes a position of the mobile device 200 using at least one of the plurality of sensors 220. In step S1104, the authentication program 212 determines if the position of the mobile device 200 is a predetermined (or known) location or position. In step S1104, if the position is a predetermined (or known) location or position (i.e., "Yes"), the process continues to step S1108, where a determination can be based on a single or a 1$^{st}$ combination of sensors. In step S1110, the authentication of the user of the mobile device 200 can be by using the single or the $1^{st}$ combination of sensors determined from step S1108.

In accordance with an exemplary embodiment, in step S1104, if the position of the mobile device 200 is not a predetermined (or known) location or position (i.e., "No"), the process continues to continues to step S1114 for a determination of the second action (2nd action) based on a $2^{nd}$ combination of sensors. In step S1116, the user of the mobile device 200 can be authenticated by the $2^{nd}$ combination of sensors determined from step S1114.

In accordance with an exemplary embodiment, if the user or the mobile device 200 cannot execute or perform one or more of the required actions in any of the exemplary embodiments, authentication of the user can (and will) be denied, for example, for the requested authentication and corresponding access and/or services. For example, in steps S1110 or S1116, if the requested actions and/or situation cannot be performed or determined using the single, $1^{st}$ combination of sensors, or the $2^{nd}$ combination of sensors, the user will not be authenticated via the mobile device 200 and access to the requested services, etc. will be denied.

Figure 12:
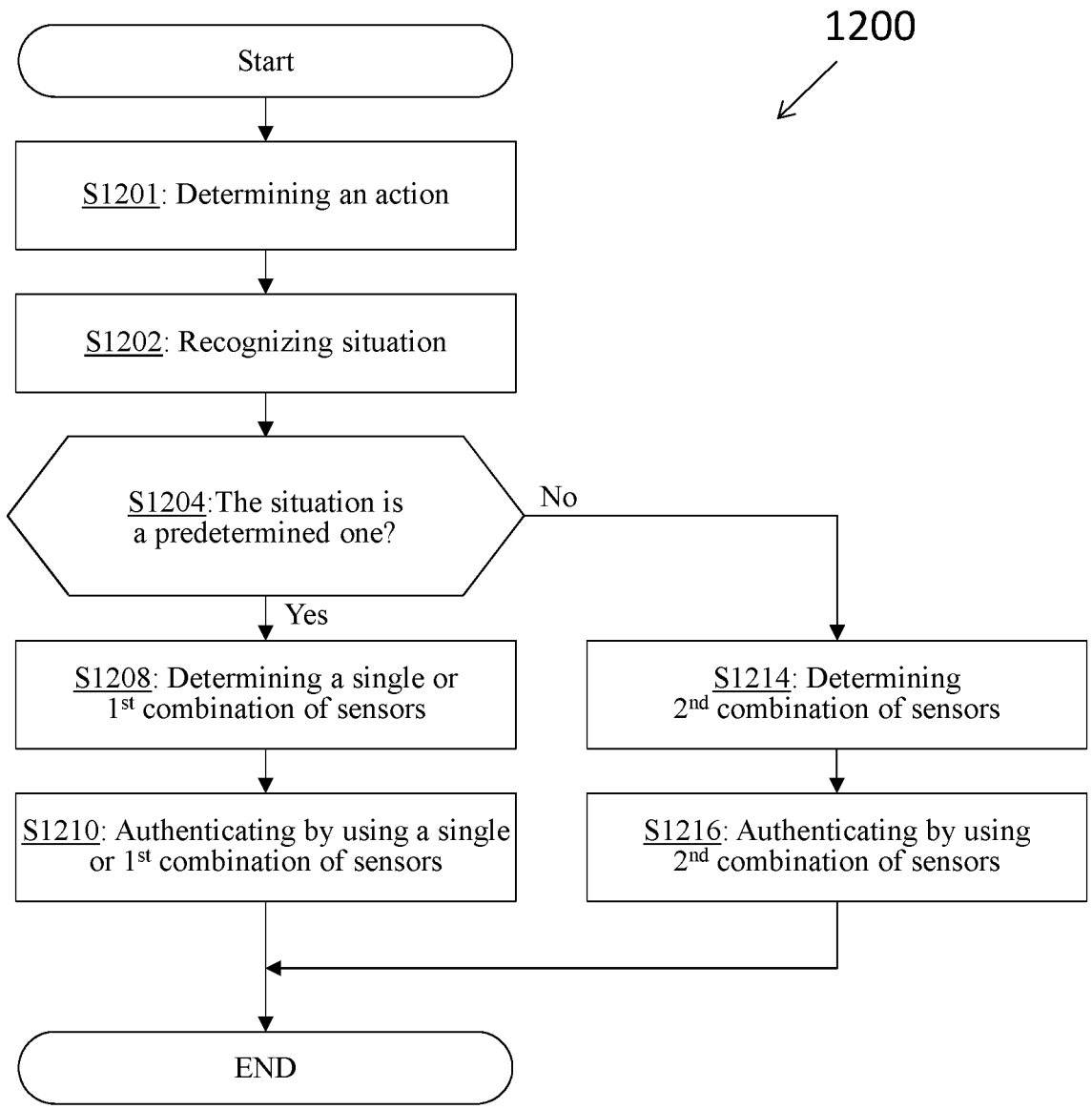
FIG. 12 is a flowchart illustrating a method and system for authenticating a user using a mobile device having plural sensors in accordance with another exemplary embodiment.

FIG. 12 is a flowchart 1200 illustrating a method and system for authenticating a user using a mobile device 200 having plural sensors 220 in accordance with another exemplary embodiment. As shown in FIG. 12, in step S1201, the authentication program 212 determines an action 900 performed by the mobile device 200. In step S1202, the authentication program 212 determines or recognizes a situation of the mobile device 200 using at least one of the plurality of sensors 220. In step S1204, the authentication program 212 determines if the situation of the mobile device 200 is a predetermined (or known) situation. In step S1204, if the situation is a predetermined (or known) situation (i.e., "Yes"), the process continues to step S1208, where a determination can be based on a single or a $1^{st}$ combination of sensors. In step S1210, the user of the mobile device 200 can be authenticated by using the single or the $1^{st}$ combination of sensors determined from step S1208.

In accordance with an exemplary embodiment, in step S1204, if the situation of the mobile device 200 is not a predetermined (or known) situation (i.e., "No"), the process continues to step S1214 for a determination of the second action (2nd action) based on a $2^{nd}$ combination of sensors. In step S1216, the user of the mobile device 200 can be authenticated by the $2^{nd}$ combination of sensors determined from step S1214.

In accordance with an exemplary embodiment, if the user or the mobile device 200 cannot execute or perform one or more of the required actions in any of the exemplary embodiments, authentication of the user can (and will) be denied, for example, for the requested authentication and corresponding access and/or services. For example, in steps S1210 or S1216, if the requested action and/or situation cannot be performed or determined using the single, $1^{st}$ combination of sensors, or the $2^{nd}$ combination of sensors, the user will not be authenticated via the mobile device 200 and access to the requested services, etc. can be denied.

Figure 13:
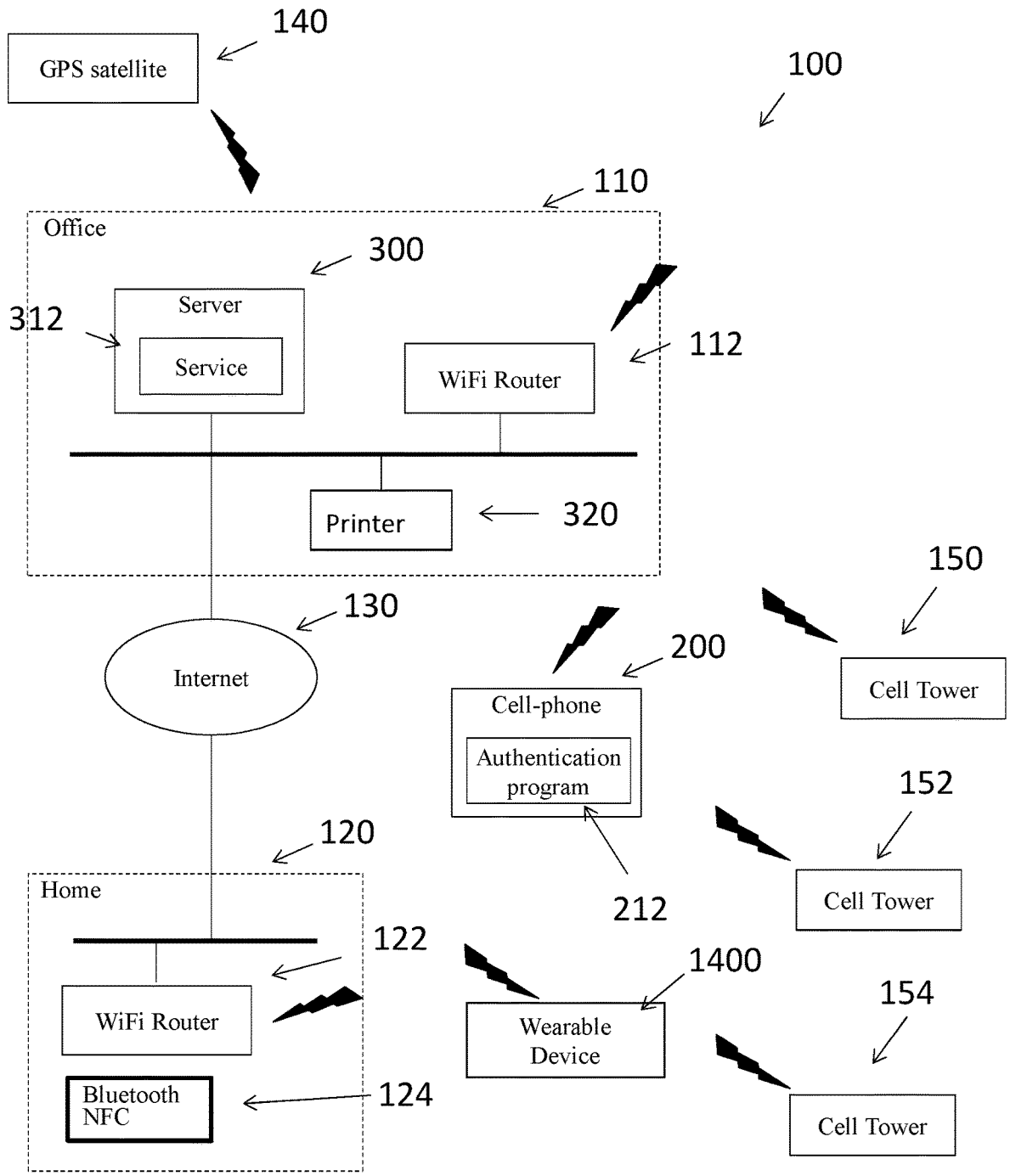
FIG. 13 is an illustration of a system in which a method and system for authenticating a user using a mobile device having plural sensors and a wearable device having plural sensors can be implemented in accordance with an exemplary embodiment

FIG. 13 is an illustration of a system 100 in which a method and system for authenticating a user using a mobile device 200 having plural sensors 220 and a wearable device 1400 having plural sensors 220 can be implemented in accordance with an exemplary embodiment. As shown in FIG. 13, the system 100 can include, for example, the office 110 having the WiFi (wireless local area networking) router 112, the server 300, and the printer 320, the home 120 having the WiFi router 122, and the wearable device 1400.

In accordance with an exemplary embodiment, the wearable device 1400 can include one or more applications configured to track activities of a user (or wearer) of the wearable device 1400. In accordance with an exemplary embodiment, the wearable device 1400 is in data communication with the mobile device 200 including the authentication program 212.

In accordance with an exemplary embodiment, the wearable device 1400 can include electronics, software, and sensors, which exchange data, for example, with a manufacturer, operator, and/or other connected devices, without requiring human intervention. For example, the data can be exchange through the internet 130 with the manufacturer, operator, and/or other connected devices.

In accordance with an exemplary embodiment, examples of wearable devices 1400 can include fitness or sport trackers and biometric devices (metrics related to human characteristics), which can devices which, can measure or detect, for example, heart rate, or electrical activity, for example, an electrocardiography (ECG or EKG). In addition, the wearable devices 1400 can include treatment devices, for example, for treatment of the hearing impairments, and speech and voice disorders, heath issue monitors, for example, for stress management, devices for alertness and energy levels, navigation tools, media devices, and communication gadgets. In addition, the wearable device 1400 can be, worn, attached, or implanted on the user, for example, worn around the wrist of the user.

For example, in accordance with an exemplary embodiment, the wearable device 1400 can detect heart rate, electrical activity of the heart, gait detection, and other personal traits of the wearer at a specific time (or instantaneously) and/or over a period of time, in which, if a condition or a metric changes, the authentication program 212 can re-authenticate the user as disclosed herein. In accordance with an exemplary embodiment, for example, if the condition or the metric of the user 200 received from the wearable device 1400 changes, and the authentication program 212 is unable to confirm the authentication of the user, the user can be asked to be re-authenticated as disclosed herein.

Figure 14:
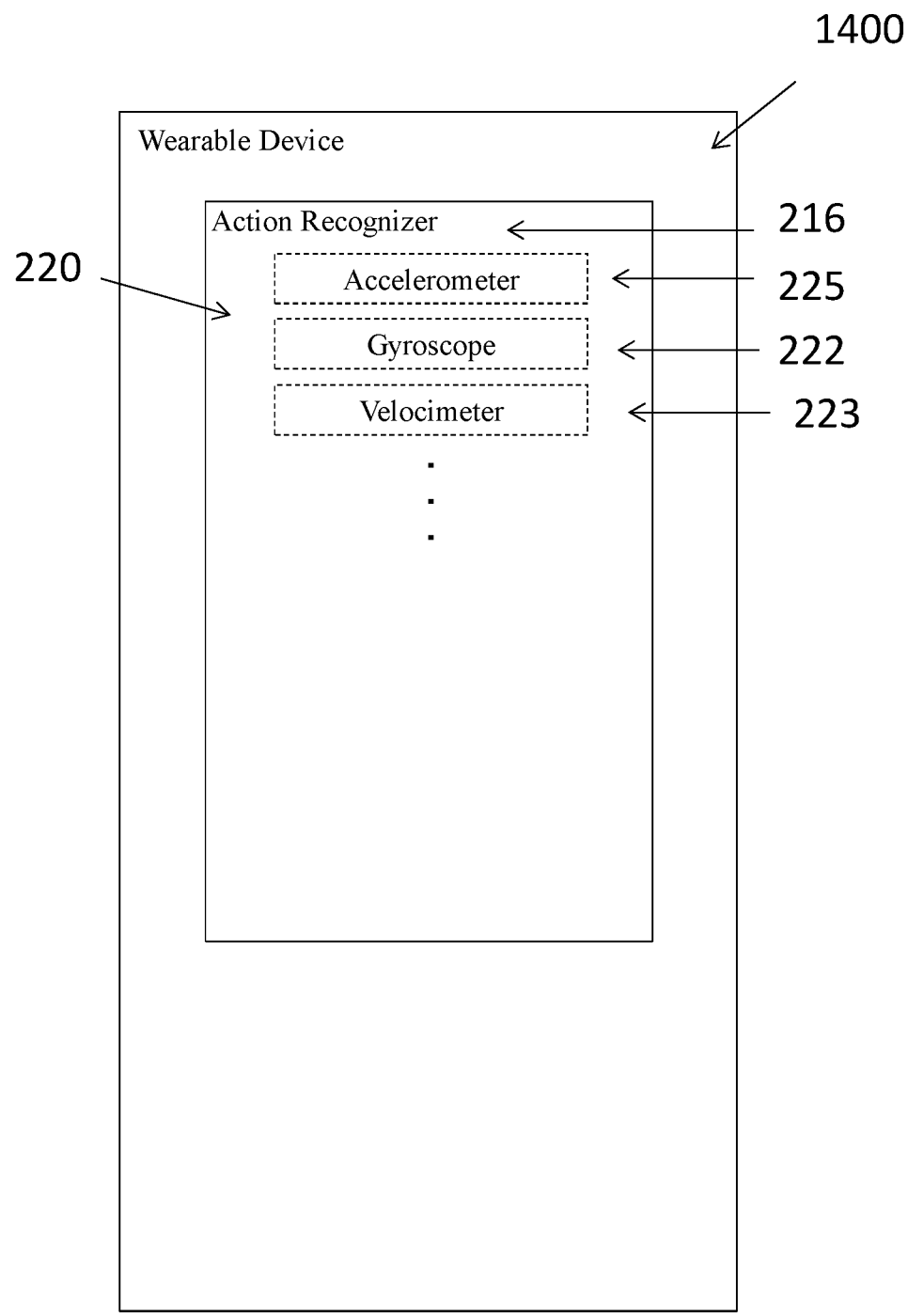
FIG. 14 is an illustration of a wearable device having plural sensors in accordance with an exemplary embodiment.

FIG. 14 is an illustration of a wearable device 1400 having plural sensors 220 in accordance with an exemplary embodiment. As shown in FIG. 14, the wearable device 1400 can include plural sensors 220, which can detect actions as disclosed herein. For example, as shown in FIG. 14, for action recognition, the wearable device 1400 can include an accelerometer 225, and a gyroscope 222, a velocimeter 223. In addition, as disclosed herein, the wearable device 1400 can include any of the plural sensors 220 of the mobile device 200 as shown in FIG. 2.

Figure 15:
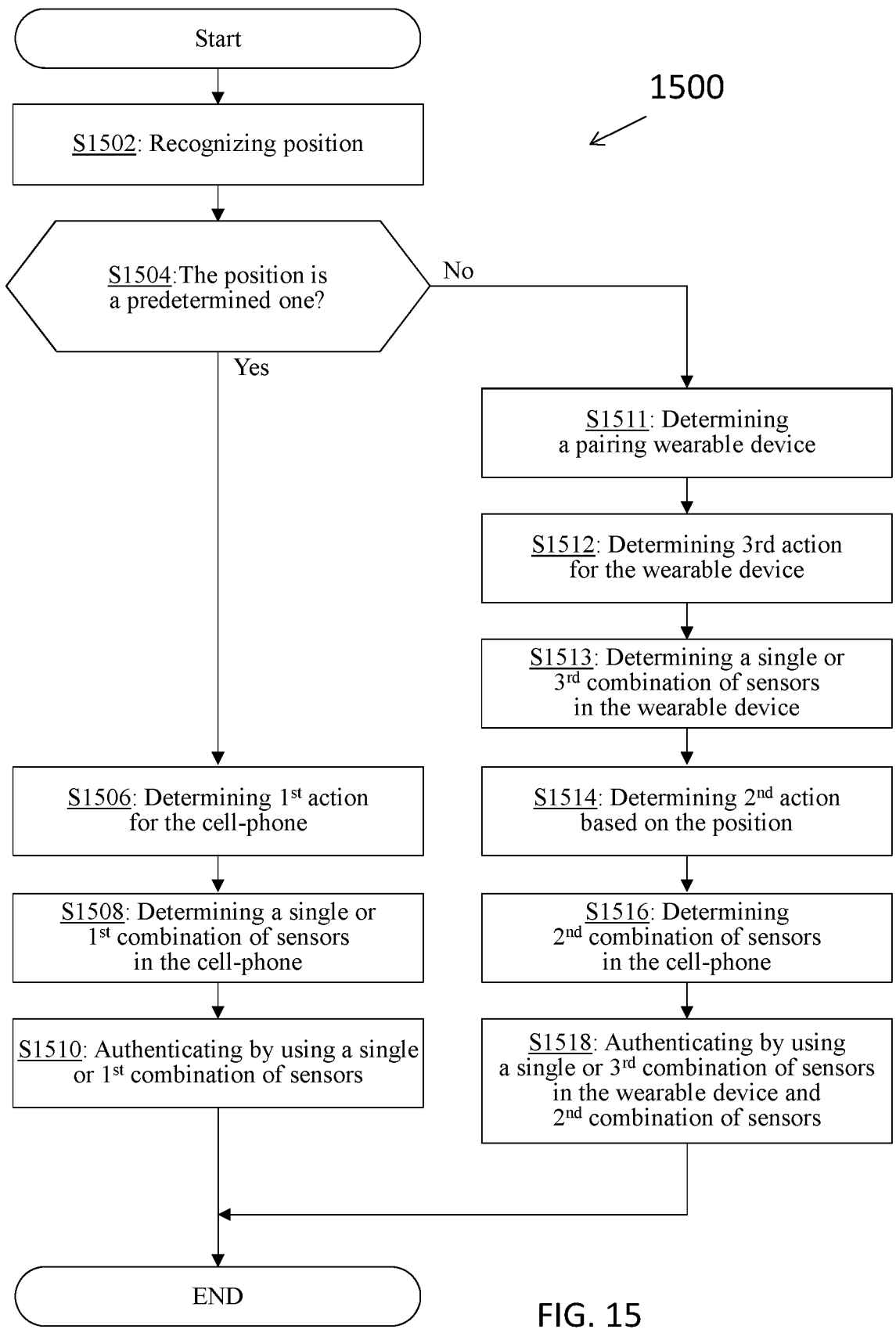
FIG. 15 is a flowchart illustrating a method and system for authenticating a user using a mobile device having plural sensors and a wearable device having plural sensors in accordance with another exemplary embodiment.

FIG. 15 is a flowchart 1500 illustrating a method and system for authenticating a user using a mobile device 200 having plural sensors 220 and a wearable device 1400 having plural sensors 200 in accordance with another exemplary embodiment. As shown in FIG. 15, in step S1502, the authentication program 212 determines or recognizes a position of the mobile device 200 using at least one of the plurality of sensors 220. In step S1504, the authentication program 212 determines if the position of the mobile device 200 is a predetermined (or known) location or position. In step S1504, if the position is a predetermined (or known) location or position (i.e., "Yes"), the process continues to step S1506, where a determination of a $1^{st}$ action for the mobile device 200 is performed. In step S1508, where a determination can be based on a single or a $1^{st}$ combination of sensors. In step S1510, the authentication of the user of the mobile device 200 can be by using the single or the $1^{st}$ combination of sensors determined from step S1508.

In accordance with an exemplary embodiment, in step S1504, if the position of the mobile device 200 is not a predetermined (or known) location or position (i.e., "No"), the process continues to continues to step S1511 for a determination if a pairing with a wearable device 1400 is already established or can be executed or performed. If a pairing with a wearable device 1400 is already established or can be executed or performed in step S1511, in step S1512, a determination of a third action ($3^{rd}$ action) for the wearable device 1400 is performed. In step S1513, the determination in step S1512 can be based on a single or $3^{rd}$ combination of sensors in the wearable device 1400. In step S1513, a determination of a $2^{nd}$ action based on position of the mobile device 200 (and wearable device 1400) is performed. In step S1516, a determination of the $2^{nd}$ combination of sensors on the mobile device 200 is performed. In step S1518, the user of the mobile device 200 can be authenticated by using a single or $3^{rd}$ combination of sensors in the wearable device 1400 and the $2^{nd}$ combination of sensors of the mobile device 200.

In accordance with an exemplary embodiment, if the user or the mobile device 200 cannot execute or perform one or more of the required actions in any of the exemplary embodiments, authentication of the user can (and will) be denied, for example, for the requested authentication and corresponding access and/or services. For example, in steps S1510 or S1518, if the requested actions and/or positions cannot be performed or determined (i.e., authenticated) using the single sensor on the mobile device 200 or wearable device 1400, the $1^{st}$ combination of sensors of the mobile device 200, the $2^{nd}$ combination of sensors of the mobile device 200, or the $3^{rd}$ combination of sensors of the wearable device 1400, the user will not be authenticated via the mobile device 200 and access, for example, to the requested services, etc. can be denied.

Figure 16:
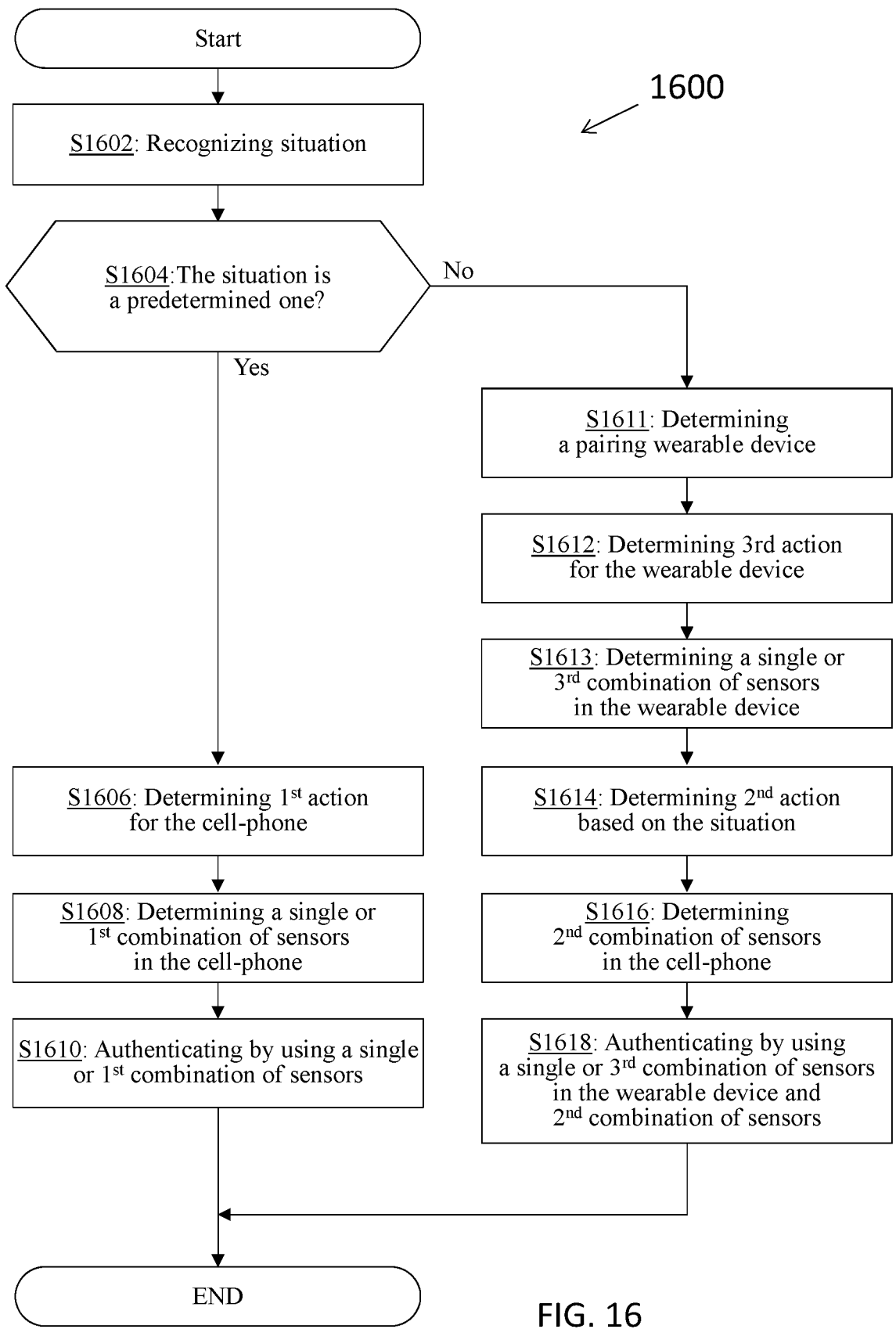
FIG. 16 is a flowchart illustrating a method and system for authenticating a user using a mobile device having plural sensors and a wearable device having plural sensors in accordance with a further exemplary embodiment.

FIG. 16 is a flowchart 1600 illustrating a method and system for authenticating a user using a mobile device 200 having plural sensors 220 and a wearable device 1400 having plural sensors 200 in accordance with a further exemplary embodiment. As shown in FIG. 16, in step S1602, the authentication program 212 determines or recognizes a situation of the mobile device 200 using at least one of the plurality of sensors 220. In step S1604, the authentication program 212 determines if the situation of the mobile device 200 is a predetermined (or known) situation. In step S1604, if the situation is a predetermined (or known) situation (i.e., "Yes"), the process continues to step S1606, where a determination of a $1^{st}$ action for the mobile device 200 is performed. In step S1608, where a determination can be based on a single or a $1^{st}$ combination of sensors. In step S1610, the authentication of the user of the mobile device 200 can be by using the single or the $1^{st}$ combination of sensors determined from step S1608.

In accordance with an exemplary embodiment, in step S1604, if the position of the mobile device 200 is not a predetermined (or known) situation (i.e., "No"), the process continues to step S1611 for a determination if a pairing with a wearable device 1400 is already established or can be executed or performed. If a pairing with a wearable device 1400 is established (or can be executed or performed in step S1611), in step S1612, a determination of a third action ($3^{rd}$ action) for the wearable device 1400 is performed. In step S1613, the determination in step S1612 can be based on a single or $3^{rd}$ combination of sensors in the wearable device 1400. In step S1613, a determination of a $2^{nd}$ action based on situation of the mobile device 200 (and wearable device 1400) is performed. In step S1616, a determination of the $2^{nd}$ combination of sensors on the mobile device 200 is performed. In step S1618, the user of the mobile device 200 can be authenticated by using a single or $3^{rd}$ combination of sensors in the wearable device 1400 and the $2^{nd}$ combination of sensors of the mobile device 200.

In accordance with an exemplary embodiment, if the user or the mobile device 200 cannot execute or perform one or more of the required actions in any of the exemplary embodiments, authentication of the user can (and will) be denied, for example, for the requested authentication and corresponding access and/or services. For example, in steps S1610 or S1618, if the requested actions and/or positions cannot be performed or determined (i.e., authenticated) using the single sensor on the mobile device 200 or wearable device 1400, the $1^{st}$ combination of sensors of the mobile device 200, the $2^{nd}$ combination of sensors of the mobile device 200, or the $3^{rd}$ combination of sensors of the wearable device 1400, the user will not be authenticated via the mobile device 200 and access, for example, to the requested services, etc. can be denied.

In accordance with an exemplary embodiment, a non-transitory computer readable program code and computer usable medium configured to execute a process of authenticating a user with a mobile device having plural sensors as disclosed herein. The non-transitory computer usable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for authenticating a user having a mobile device with plural sensors, the method comprising:
    enrolling the user of the mobile device into an authentication program, the enrollment of the user of the mobile device into the authentication program including requesting the user to perform a series of actions with the mobile device, each of the series of actions incorporating one or more of the plural sensors of the mobile device and the series of actions including at least a first action and a second action;
    recognizing a situation of the mobile device or the user;
    determining if the situation of the mobile device or the user is a predetermined situation;
    when the situation is the predetermined situation:
        determining the first action as an authentication action;
        determining a single sensor or a first combination of sensors among the plural sensors; and
        executing a first authentication for the user by using the single sensor or the first combination of sensors;

when the situation is not the predetermined situation:
   determining the second action as the authentication action;
   determining a second combination of sensors among the plural sensors; and
   executing a second authentication for the user by using the second combination of sensors; and
incorporating a machine-learning program or algorithm into the authentication program to reduce or increase a level of authentication for the mobile device and the user based on previous authentication requests for a same or a similar service or request.

2. The method according to claim 1, wherein the situation is one of:
   a location;
   a moving state or a stopping state of the mobile device;
   an authentication failure history for the user of the mobile device;
   a lightness or a darkness reading obtained by the mobile device in connection with a location of the mobile device; and
   an objective of authentication; or
   a combination of at least two of the location, the moving or the stopping state of the mobile device, the authentication failure history for the user of the mobile device, the lightness or the darkness reading obtained by the mobile device in connection with a location of the mobile device, and the objective of authentication.

3. The method according to claim 1, wherein the first action or the second action is one of:
   holding the mobile device;
   tapping a finger on the mobile device;
   walking, sitting and standing;
   flipping the mobile phone;
   occluding a light sensor of the mobile phone;
   touching a predetermined position on a touch panel of the mobile device; or
   a combination of at least two of the holding of the mobile device, the tapping of the finger on the mobile device, the walking, sitting and standing, the flipping of the mobile phone, and the occluding the light sensor of the mobile phone.

4. The method according to claim 1, wherein a number of sensors or actions for the second authentication is more than the number of sensors or actions for the first authentication.

5. The method according to claim 1, wherein the plural sensors include a GPS receiver, a gyroscope, a velocimeter, a rotation vector sensor, an accelerometer, a light sensor, a proximity sensor, an orientation sensor, a gravity sensor, a touch panel, a microphone, a magnetic sensor, and a camera.

6. The method according to claim 1, comprising:
   increasing a number of sensors or actions after at least one authentication failure.

7. The method according to claim 1, wherein the first authentication and the second authentication provide the user with access to at least one service, and wherein the at least one service is access to an office or home, access to a device, access to an application hosted on the mobile device, access to an Internet or Intranet, and/or access to a bank account, financial records, or medical records.

8. The method according to claim 1, further comprising:
   hosting the authentication program on the mobile device, the authentication program configured to execute a process for authenticating the user to access one or more services.

9. The method according to claim 1, wherein when the situation of the mobile device or the user is not the predetermined situation, the method further comprising:
   determining a wearable device to be used for authentication;
   determining a third action as an authentication action corresponding to the wearable device;
   determining a single or third combination of sensors in the wearable device; and
   executing the second authentication for the user by using the second combination of sensors among the plural sensors of the mobile device and the single or third combination of sensors in the wearable device.

10. The method according to claim 9, wherein the wearable device is configured to detect one or more of the following:
    heart rate of the user;
    electrical activity of a heart of the user; or
    gait of the user.

11. The method according to claim 1, wherein the mobile device is a smart phone, and wherein the first authentication and the second authentication provide the user with physical access to an office, a building, or a home.

12. A non-transitory computer readable program code configured to execute a process as recited in claim 1.

13. A method for authenticating a user having a mobile device with plural sensors, the method comprising:
   enrolling the user of the mobile device into an authentication program, the enrollment of the user of the mobile device into the authentication program including requesting the user to perform a series of actions with the mobile device, each of the series of actions incorporating one or more of the plural sensors of the mobile device;
   determining a first action as an authentication action;
   recognizing a situation of the mobile device or the user;
   determining if the situation of the mobile device or the user is a predetermined situation;
   when the situation is the predetermined situation:
      determining a single sensor or first combination of sensors among the plural sensors to execute the first action; and
      executing a first authentication for a user using the single sensor or the first combination of sensors;
   when the situation is not the predetermined situation:
      determining a second combination of sensors among the plural sensors to execute the first action; and
      executing a second authentication for the user using the second combination of sensors; and
   incorporating a machine-learning program or algorithm into the authentication program to reduce or increase a level of authentication for the mobile device and the user based on previous authentication requests for a same or a similar service or request.

14. The method according to claim 13, comprising:
    increasing a number of sensors or actions after at least one authentication failure.

15. The method according to claim 13, wherein the first authentication and the second authentication provide the user with access to at least one service, and wherein the at least one service is access to an office or home, access to a device, access to an application hosted on the mobile device, access to an Internet or Intranet, and/or access to a bank account, financial records, or medical records.

16. The method according to claim 13, further comprising:

hosting an authentication program on the mobile device, the authentication program configured to execute a process for authenticating the user to access one or more services.

17. The method according to claim 13, wherein when the situation of the mobile device or the user is not the predetermined situation, the method further comprising:
determining a wearable device to be used for authentication;
determining a third action as an authentication action corresponding to the wearable device;
determining a single or third combination of sensors in the wearable device; and
executing the second authentication for the user by using the second combination of sensors among the plural sensors of the mobile device and the single or third combination of sensors in the wearable device.

18. The method according to claim 17, wherein the wearable device is configured to detect one or more of the following:
heart rate of the user;
electrical activity of a heart of the user; or
gait of the user.

19. The method according to claim 13, wherein the mobile device is a smart phone, and wherein the first authentication and the second authentication provide the user with physical access to an office, a building, or a home.

20. A non-transitory computer readable program code configured to execute a process as recited in claim 13.

* * * * *